P. SHELDON.
Apparatus for Mining Coal.
No. 155,593. Patented Oct. 6, 1874.
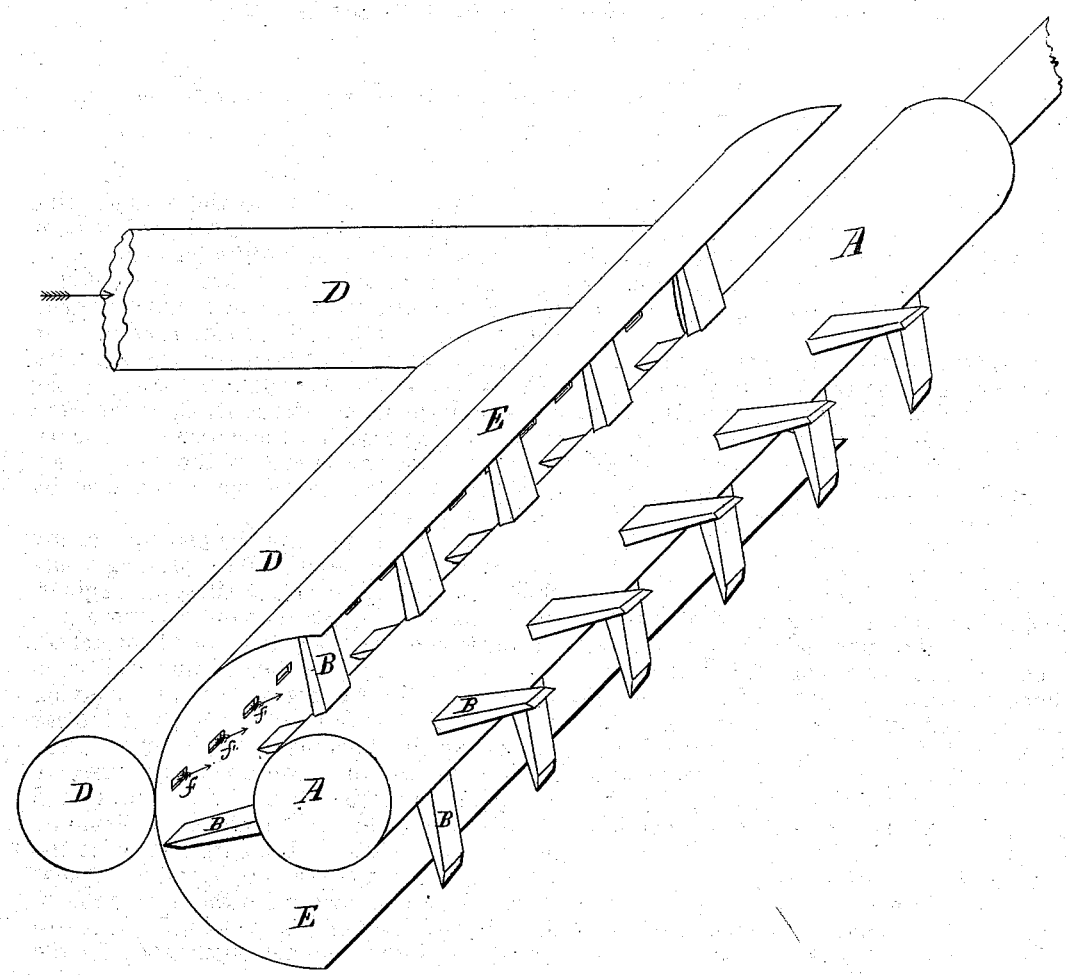
Witnesses:
John A. Hall Jr.
Will J. Smith
Inventor:
Porter Sheldon

UNITED STATES PATENT OFFICE.

PORTER SHELDON, OF JAMESTOWN, NEW YORK.

IMPROVEMENT IN APPARATUS FOR MINING COAL.

Specification forming part of Letters Patent No. 155,593, dated October 6, 1874; application filed August 1, 1874.

*To all whom it may concern:*

Be it known that I, PORTER SHELDON, of Jamestown, in the county of Chautauqua and State of New York, have invented a Mining-Machine, of which the following is a specification:

My invention consists of a cutting-bar, with chisels or cutters inserted therein at right angles to the axis of the bar at intervals along the entire length of the bar, and on one or more sides thereof, as the material to be cut may require, thus producing cuts at intervals along the face of the channel to be made, leaving the portions not cut to crumble or tear out, or, by inserting more cutters on more lines, to cut with one revolution of the bar the entire face of the channel along the whole length of the bar, as the material being operated upon may require, by reason of its brittleness or otherwise, combined with a device for removing the cuttings from the channel, consisting of a follower closing up the channel behind the cutting-bar, so as to leave the cutting-bar revolving in a tube, one side of which being the face of the channel to be operated on and the other being the follower aforesaid; and the cutting-bar being rotated by a shaft operated by engines driven by compressed air, the exhaust of the engines is conducted in a pipe to and along the follower, and through orifices in the pipe and follower, into the back end of the tube or space where the cutting-bar revolves, and from thence back along said tube or space out to the face of the coal, carrying with it or blowing out the cuttings from the channel.

The cutting-bar and blower may be constructed by taking a bar of steel, A, of proper dimensions, in which to insert the cutting-points B B, which are held in place by set-screws C. Attach one end of this bar to the shaft of the machine by a sleeve or other device. Attach a pipe, D, to the exhaust-pipe of the engine, letting it run forward to near the connection of the cutting-bar and shaft, and thence immediately behind the cutting-bar to its outer end. Take a strip of sheet-iron of the length of the cutting-bar, and of sufficient width, when formed into one-third of a circle, to fill the channel made by the cutters; form it and attach it, E, to the front side of the pipe behind the cutting-bar; make holes *f f f* for the escape of the compressed air from the pipe into the space occupied by the cutting-bar.

I contemplate applying the principle of my invention above described by running a machine, consisting of two oscillating engines, crank-shaft, and gear thereon, driving a pinion-shaft to which the cutting-bar is attached, on a track along the face of the coal to be mined, with the cutters on the bar revolving in the same direction as the wheels of the car supporting the machine on the track, the bar cutting its way by a continuous progressive cut along the whole face of the mining, and to a distance under the substance to be mined equal to the length of the cutting-bar, at one cut, with the compressed air from the exhaust of the engines throwing out the cuttings from the channel, leaving the cutting-bar free to operate, and the channel open ready for the fall.

What I claim as my invention, and desire to secure by Letters Patent, is—

The rotary cutting-bar A, having cutters B, and the combination therewith of the follower E and air-tube D, having openings *f f*, &c., as and for the purposes described.

PORTER SHELDON.

Witnesses:
JOHN A. HALL, Jr.,
WILL I. SMITH.